(12) United States Patent
Mu

(10) Patent No.: US 11,864,241 B2
(45) Date of Patent: Jan. 2, 2024

(54) RANDOM ACCESS METHOD AND APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 59 days.

(21) Appl. No.: 17/628,870

(22) PCT Filed: Jul. 25, 2019

(86) PCT No.: PCT/CN2019/097781
§ 371 (c)(1),
(2) Date: Jan. 20, 2022

(87) PCT Pub. No.: WO2021/012279
PCT Pub. Date: Jan. 28, 2021

(65) Prior Publication Data
US 2022/0256617 A1    Aug. 11, 2022

(51) Int. Cl.
*H04W 72/1263*    (2023.01)
*H04W 74/08*      (2009.01)
*H04W 74/00*      (2009.01)

(52) U.S. Cl.
CPC ... *H04W 74/0841* (2013.01); *H04W 72/1263* (2013.01); *H04W 74/004* (2013.01); *H04W 74/0866* (2013.01)

(58) Field of Classification Search
CPC ............... H04W 56/005; H04W 56/00; H04W 72/1263; H04W 72/21; H04W 74/004;
(Continued)

(56) References Cited

U.S. PATENT DOCUMENTS

2010/0271970 A1   10/2010   Pan et al.
2015/0334699 A1   11/2015   Uchino et al.
(Continued)

FOREIGN PATENT DOCUMENTS

CN   102124807 A1   7/2011
CN   102238622 A    11/2011
(Continued)

OTHER PUBLICATIONS

International Search Report of PCT Application No. PCT/CN2019/097781 dated Apr. 23, 2020 with English translation, (4p).
(Continued)

*Primary Examiner* — Nathan S Taylor
(74) *Attorney, Agent, or Firm* — Arch & Lake LLP

(57) ABSTRACT

A random access method, including: determining, by a terminal, that a transmission of an uplink control information overlaps with a transmission of a Msg.A on a physical uplink shared channel (PUSCH); judging whether to allow the transmission of the uplink control information to be multiplexed in the PUSCH; in response to allowing the transmission of the uplink control information to be multiplexed in the PUSCH, multiplexing the transmission of the uplink control information in the PUSCH; and in response to not allowing the transmission of the uplink control information to be multiplexed in the PUSCH, transmitting the uplink control information on a physical uplink control channel (PUCCH).

10 Claims, 6 Drawing Sheets

(58) Field of Classification Search
CPC ......... H04W 74/0841; H04W 74/0866; H04W 74/0833; H04W 72/04; H04W 72/12; H04W 74/00; H04W 74/08; G01S 13/003; G01S 13/765; G01S 13/767; G01S 13/87; G01S 13/00; G01S 13/76; G01S 5/02; H04L 43/0864; H04L 5/0048; H04L 5/0053
See application file for complete search history.

(56) References Cited

U.S. PATENT DOCUMENTS

| | | | | |
|---|---|---|---|---|
| 2020/0029283 | A1* | 1/2020 | Lei | H04W 72/21 |
| 2020/0275505 | A1* | 8/2020 | Lei | H04B 7/0695 |
| 2020/0305203 | A1* | 9/2020 | Liu | H04W 74/0866 |
| 2020/0314709 | A1* | 10/2020 | Ly | H04W 72/23 |
| 2020/0322926 | A1* | 10/2020 | Ly | H04W 74/008 |
| 2020/0351801 | A1* | 11/2020 | Jeon | H04W 52/48 |
| 2021/0022058 | A1* | 1/2021 | Islam | H04W 56/001 |
| 2021/0329703 | A1* | 10/2021 | Yang | H04L 5/001 |
| 2021/0410200 | A1* | 12/2021 | Cirik | H04W 74/0841 |
| 2022/0039174 | A1* | 2/2022 | Dai | H04W 74/0833 |
| 2022/0078854 | A1* | 3/2022 | Xiong | H04W 74/0841 |
| 2022/0132595 | A1* | 4/2022 | Ko | H04L 5/0044 |
| 2022/0150018 | A1* | 5/2022 | Ko | H04L 5/0055 |
| 2022/0173856 | A1* | 6/2022 | Ko | H04W 4/40 |
| 2022/0232642 | A1* | 7/2022 | Ko | H04L 5/0053 |
| 2022/0240326 | A1* | 7/2022 | Rune | H04W 74/0866 |

FOREIGN PATENT DOCUMENTS

| | | | | |
|---|---|---|---|---|
| CN | 102957508 | A1 | 3/2013 | |
| CN | 103037529 | A | 4/2013 | |
| CN | 104904291 | A | 9/2015 | |
| CN | 109905215 | A | 6/2019 | |
| EP | 4027742 | A1 * | 7/2022 | ........ H04W 74/0833 |

OTHER PUBLICATIONS

Intel Corporation. "Discussion on procedure for 2-step RACH", 3GPP TSG RAN WG1 #97 R1-1906780, Reno, NV, May 17, 2019, (7p).

Huawei et al., "Discussion on 2-step RACH procedure", 3GPP ISG RAN WG1 Meeting #97 R1-1906051, Reno, NV, May 17, 2019, (12p).

* cited by examiner

RANDOM ACCESS METHOD AND APPARATUS, AND STORAGE MEDIUM

CROSS-REFERENCE TO RELATED APPLICATION

The present application is a U.S. National Phase Application of International Patent Application Serial No. PCT/CN2019/097781 filed on Jul. 25, 2019. The entire content of the above-cited application is hereby incorporated by reference in its entirety for all purposes.

TECHNICAL FIELD

The present disclosure relates to the field of communication technology, in particular to a random access method and apparatus, and a storage medium.

BACKGROUND

A new random access mechanism is introduced in a random access channel (RACH) technology to shorten access delay. In this new random access mechanism, Msg.A is transmitted in step 1 and Msg.B is received in step 2, which is referred to as a 2-step random access channel (2-step RACH).

SUMMARY

The present disclosure provides a random access method and apparatus, and a storage medium.

According to a first aspect of an example of the present disclosure, a random access method is provided. The random access method is applied to a terminal, and includes: determining that a transmission of an uplink control information overlaps with a transmission of a Msg.A on a physical uplink shared channel (PUSCH); judging whether to allow the transmission of the uplink control information to be multiplexed in the PUSCH; in response to allowing the transmission of the uplink control information to be multiplexed in the PUSCH, multiplexing the transmission of the uplink control information in the PUSCH; and in response to not allowing the transmission of the uplink control information to be multiplexed in the PUSCH, transmitting the uplink control information on a physical uplink control channel (PUCCH).

According to a second aspect of an example of the present disclosure, a random access method is provided. The random access method is applied to a network device, and includes: determining that a random access preamble is received but a Msg.A on a physical uplink shared channel (PUSCH) is not received; and transmitting a Msg.B, where the Msg.B includes information representing a PUSCH allocation resource.

According to a third aspect of an example of the present disclosure, a random access apparatus is provided. The random access apparatus is applied to a terminal, and includes: a processor; and a memory configured to store processor-executable instructions. The processor is configured to: execute the above random access method according to the first aspect or any one of implementations of the first aspect.

It should be understood that the above general descriptions and the following detailed descriptions are exemplary and explanatory only, and are not intended to limit the present disclosure.

BRIEF DESCRIPTION OF THE DRAWINGS

The accompanying drawings, which are incorporated in and constitute a part of this specification, illustrate examples consistent with the present disclosure and together with the specification serve to explain the principles of the present disclosure.

DETAILED DESCRIPTION

Figure 1:
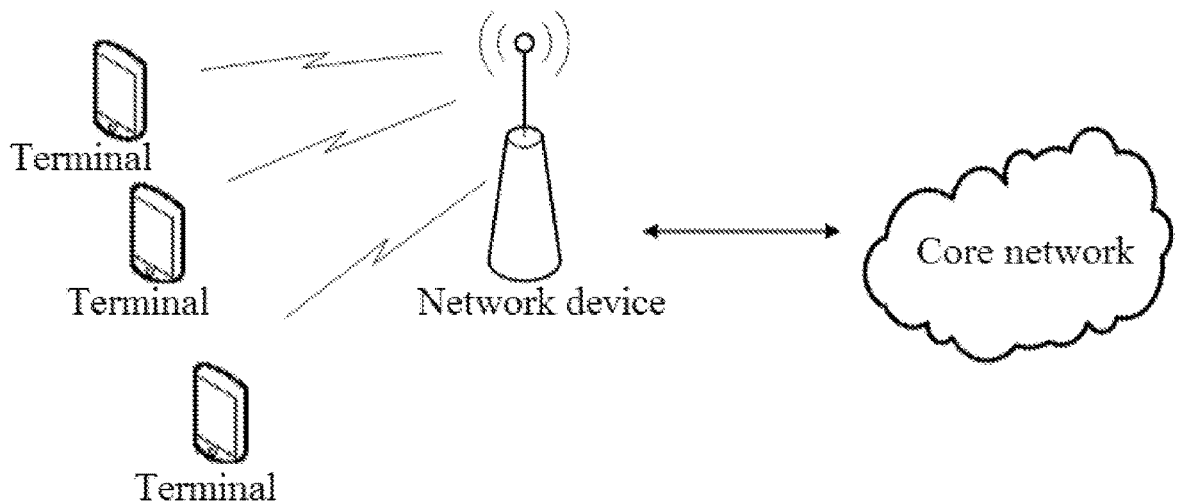
FIG. 1 is a schematic diagram of a wireless communication system according to some examples.

Examples will be described in detail herein, instances of which are illustrated in the accompanying drawings. When the following description refers to the accompanying drawings, the same numbers in different drawings represent the same or similar elements unless otherwise indicated. The implementations described in the following examples do not represent all implementations consistent with the present disclosure. On the contrary, they are merely examples of an apparatus and a method consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In the related art, in the case that a terminal adopts the 2-step RACH mechanism for random access, in response to uplink control information (UCI) needing to be fedback, the transmission of the UCI is multiplexed in a physical uplink shared channel (PUSCH) that transmits the Msg.A in step 1. However, in the 2-step RACH, the PUSCH of the Msg.A is a common resource, and there is a possibility of transmission failure. Thus, there is a possibility of transmission failure if the transmission of the UCI is multiplexed in the PUSCH that transmits the Msg.A.

The present disclosure provides a random access method. The method may be applied to a wireless communication system as shown in FIG. 1. As shown in FIG. 1, a terminal accesses a network through a network device such as a base station. The network device and a core network complete backhaul and forward transmission of data for various communication services.

It can be understood that the wireless communication system is a network that provides wireless communication functions. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to capacity, speed, delay and other factors of different networks, the network may be divided into a $2^{nd}$ generation (2G) network, a 3G network, a 4G network or a future evolution network, such as a 5G network which may also be referred to as a new radio (NR). For the ease of description, the present disclosure sometimes simply refers to the wireless communication network as a network or a system. The network in the present disclosure may include a radio access network (RAN) and a core network (CN). The network includes the network device, and the network device may be, for example, a wireless access network node, a core network device or the like. The wireless access network node may also be referred to as the base station. The network may provide network services for the terminal through the network device. Different operators may provide different network services for the terminal. It may also be understood that different operators correspond to different operator networks.

The terminal, also referred to as user equipment (UE), a mobile station (MS), a mobile terminal (MT), etc., is a device to provide users with voice and/or data connectivity. For example, the terminal may be a handheld device, a vehicle-mounted device, etc., which have a wireless connection function. At present, some instances of the terminals are: mobile phones, pocket personal computers (PPC), palm-top computers, personal digital assistants (PDA), notebook computers, tablet computers, wearable devices, or vehicle-mounted devices, etc.

Figure 2:
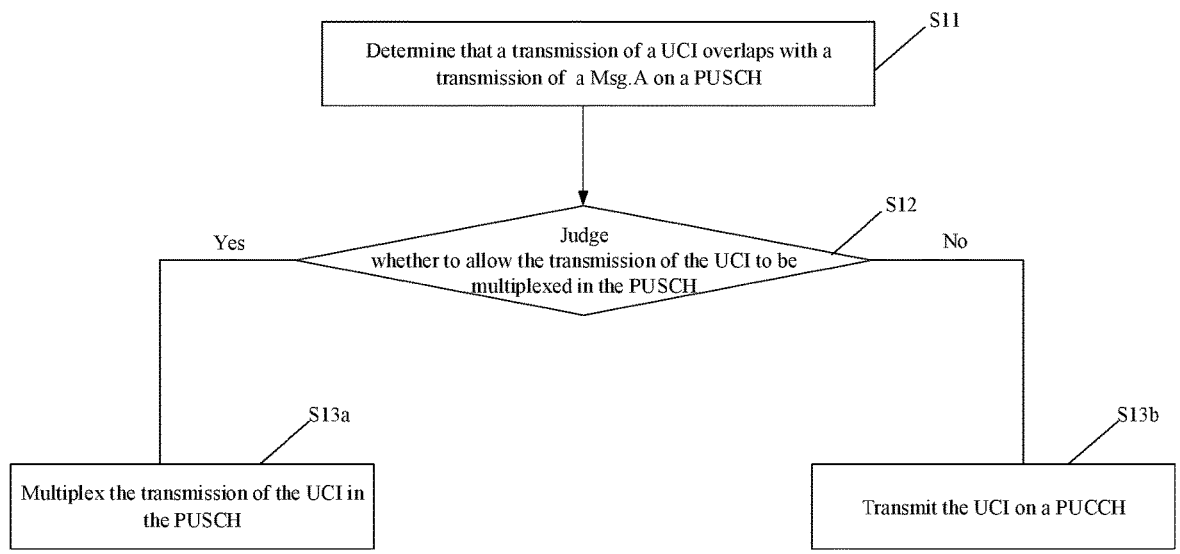
FIG. 2 is a flowchart of a random access method according to an example.

When preparing to access the network, the terminal needs to complete random access. A 2-step RACH mechanism is introduced in the related art for random access. FIG. 2 is a flowchart of a 2-step RACH method according to an example. Referring to FIG. 2, when performing random access, the terminal may first obtain a synchronization broadcast block to obtain synchronization and system messages, and then transmit a random access preamble in a physical random access channel (PRACH) corresponding to the obtained synchronization broadcast block. In the 2-step RACH, message A (Msg.A) is transmitted in Step 1, that is, the terminal selects an appropriate preamble to be transmitted on a PRACH resource, and at the same time, the network device may perform preamble detection on a corresponding PRACH. The terminal transmits payload information on a corresponding PUSCH resource. The payload information includes equivalent information of Msg.3 in traditional 4-step RACH, such as user identity (ID), and may also contain part of user data. When the network device has detected the preamble, the network device may receive data on a corresponding PUSCH. In Step 2, a message B (Msg.B) is transmitted, that is, when the network device successfully receives the preamble or both the preamble and the data, it transmits the Msg.B to the terminal. The Msg.B contains part of equivalent information of the Msg.2 and a Msg.4 in the traditional 4-step RACH process, such as time synchronization information in the Msg.2 and conflict resolution information in the Msg.4. A transmission manner of the Msg.B is physical downlink control channel (PDCCH)+ physical downlink shared channel (PDSCH), which is similar to the traditional 4-step RACH. A PDSCH may include information about a plurality of users. The terminal receives the Msg.B on a corresponding physical resource, and extracts information for the terminal.

The terminal may trigger random access in a radio resource control (RRC) connected state and an RRC idle state. In the RRC connected state, the terminal may feedback UCI to the network device. The UCI may be a channel state information (CSI), or a hybrid automatic repeat request (HARM) feedback for downlink data, etc. In the related art, if the terminal determines that there is UCI to be transmitted in the RRC connected state, and the transmitting time of the UCI is the same as the transmitting time of the Msg.A in a PUSCH, the transmission of the UCI is multiplexed in the PUSCH. The PUSCH of the Msg.A is a common resource, there is a possibility that two terminals use the same PUSCH, and besides, there is no link adaptation mechanism, so transmission of the Msg.A on the PUSCH is more robust, and there is a possibility of transmission failure. Thus, multiplexing the transmission of the UCI in the PUSCH of the Msg.A has the possibility of transmission failure.

In view of this, the present disclosure provides a random access method. In this method, in response to determining that there is a transmission of a UCI overlapping with a transmission of a Msg.A on a PUSCH, it is judged whether to allow the transmission of the UCI to be multiplexed in the PUSCH. In response to allowing the transmission of the UCI to be multiplexed in the PUSCH, the transmission of the UCI is multiplexed in the PUSCH, reducing a possibility of transmission failure of the UCI. In response to not allowing the transmission of the UCI to be multiplexed in the PUSCH, the UCI is transmitted on a PUCCH. Since transmission robustness of the PUCCH is lower than transmission robustness of the PUSCH, the possibility of the transmission failure of the UCI may be reduced.

FIG. 2 is a flowchart of a random access method according to an example. As shown in FIG. 2, the random access method is applied to a terminal, and includes the following steps.

In step S11, it is determined that there is a transmission of a UCI overlapping with a transmission of a Msg.A on a PUSCH.

In the present disclosure, the terminal first determines whether the terminal is in an RRC connected state, and in response to the terminal being in the RRC connected state, the terminal further determines whether there is a UCI that needs to be transmitted. In response to there being no UCI that needs to be transmitted, random access may be performed according to an existing random access technology. In response to there being a UCI that needs to be transmitted, it is further judged whether there is a possibility that the UCI and the PUSCH may be overlapped. In response to there being the possibility that the UCI and the PUSCH may be overlapped, step S12 will be executed. In response to there being no possibility that the UCI and the PUSCH may be overlapped, random access may be performed according to the existing random access technology.

In step S12, it is judged whether to allow the transmission of the UCI to be multiplexed in the PUSCH.

The present disclosure may determine whether to allow the transmission of the UCI to be multiplexed in the PUSCH according to a communication link state. In the case that the communication link state is sufficient for reliable transmission of the UCI, such as transmission in the PUCCH, the transmission of the UCI is not allowed to be multiplexed in the PUSCH. In the case that the communication link state is not sufficient for reliable transmission of the UCI, the transmission of the UCI is allowed to be multiplexed in the PUSCH.

In an example of the present disclosure, a preset transmission rule for whether to allow the transmission of the UCI to be multiplexed in the PUSCH is predetermined according to the communication link state. The preset transmission rule may be: in response to the communication link being in an abnormal state, the transmission of the UCI is allowed to be multiplexed in the PUSCH, and in response to the communication link being in a normal state, the transmission of the UCI is not allowed (that is, is prohibited) to be multiplexed in the PUSCH. When the communication link is in the abnormal state, the reliable transmission of the UCI may not be guaranteed, so the transmission of the UCI may be multiplexed in the PUSCH. If the PUSCH is successfully transmitted, then the UCI is successfully transmitted, which has a higher transmission success rate than not multiplexing the transmission of the UCI in the PUSCH. If the communication link is in the normal state, the reliable transmission of the UCI may be guaranteed, however, if the transmission of the UCI is multiplexed in the PUSCH at this time, there is a possibility of transmission failure, so there is no need to multiplex the transmission of the UCI in the PUSCH.

In the present disclosure, the abnormal state of the communication link includes one or a combination of the following states: a state that a downlink data arrivals but uplink is out-of synchronization; a state that an uplink data arrivals but uplink is out-of synchronization; or a state that a beam connection is failure. The normal state of the communication link includes one or a combination of the following states: a state that an uplink data arrives but there is no PUCCH resource for transmitting a scheduling request; or a state that the uplink data arrives but the scheduling request is failure.

If there is the preset transmission rule in the present disclosure, whether to allow the transmission of the UCI to be multiplexed in the PUSCH may be judged according to the preset transmission rule.

In step S13a, in response to allowing the transmission of the UCI to be multiplexed in the PUSCH, the transmission of the UCI is multiplexed in the PUSCH.

In the present disclosure, in response to allowing the transmission of the UCI to be multiplexed in the PUSCH, the transmission of the UCI is multiplexed in the PUSCH for a 2-step RACH process. An existing random access method may be used to multiplex the transmission of the UCI in the PUSCH for the 2-step RACH process, which will not be repeated here.

In step S13b, in response to not allowing the transmission of the UCI to be multiplexed in the PUSCH, the UCI is transmitted on the PUCCH.

In the present disclosure, in response to not allowing the transmission of the UCI to be multiplexed in the PUSCH, the UCI is transmitted on the PUCCH with lower transmission robustness, which improves the transmission success rate of the UCI.

In the following, the present disclosure will illustrate the process of implementing random access in the case that the transmission of the UCI is not allowed to be multiplexed in the PUSCH in combination with practical applications.

In one example, in the present disclosure, before the terminal performs the 2-step RACH, the terminal first judges whether the transmitting time of the UCI coincides with the transmitting time of the Msg.A on the PUSCH. In response to the transmitting time of the UCI coinciding with the transmitting time of the Msg.A on the PUSCH, the terminal may give priority to transmitting the UCI in the PUCCH. The 2-step RACH is began after the transmission of the UCI is completed. That is, after determining that the transmission of the UCI on the PUCCH is completed, the terminal transmits the Msg.A and receives the Msg.B. In response to the transmitting time of the UCI does not coincide with the transmitting time of the Msg.A on the PUSCH, transmitting the UCI on the PUCCH and the process of transmitting the Msg.A and receiving the Msg.B may be performed separately.

In another example, before the terminal decides to perform the 2-step RACH, the terminal first determines whether the transmission of the UCI coincides with the transmission of the Msg.A on the PUSCH. In response to the transmission time of the UCI coinciding with the transmission time of the Msg.A on the PUSCH, the terminal transmits a preamble in the Msg.A first. Then at the moment when the PUSCH should be transmitted, the terminal abandons transmitting the PUSCH and transmits the UCI on a PUCCH resource. Since the terminal only transmits the preamble and does not transmit the PUSCH, a network device receives the preamble but does not receive the PUSCH. In this case, the network device may allocate a resource for transmitting the PUSCH again for the terminal, and performs the random access process of Step2 with the terminal to transmit the Msg.B to the terminal, which may also be understood as a fallback to a traditional 4-step RACH process. The network device transmits the Msg.B to the terminal. Information representing a PUSCH allocation resource is configured in the Msg.B. The terminal receives the Msg.B, determines the PUSCH allocation resource according to the Msg.B, and transmits the PUSCH on the PUSCH allocation resource.

Figure 3:
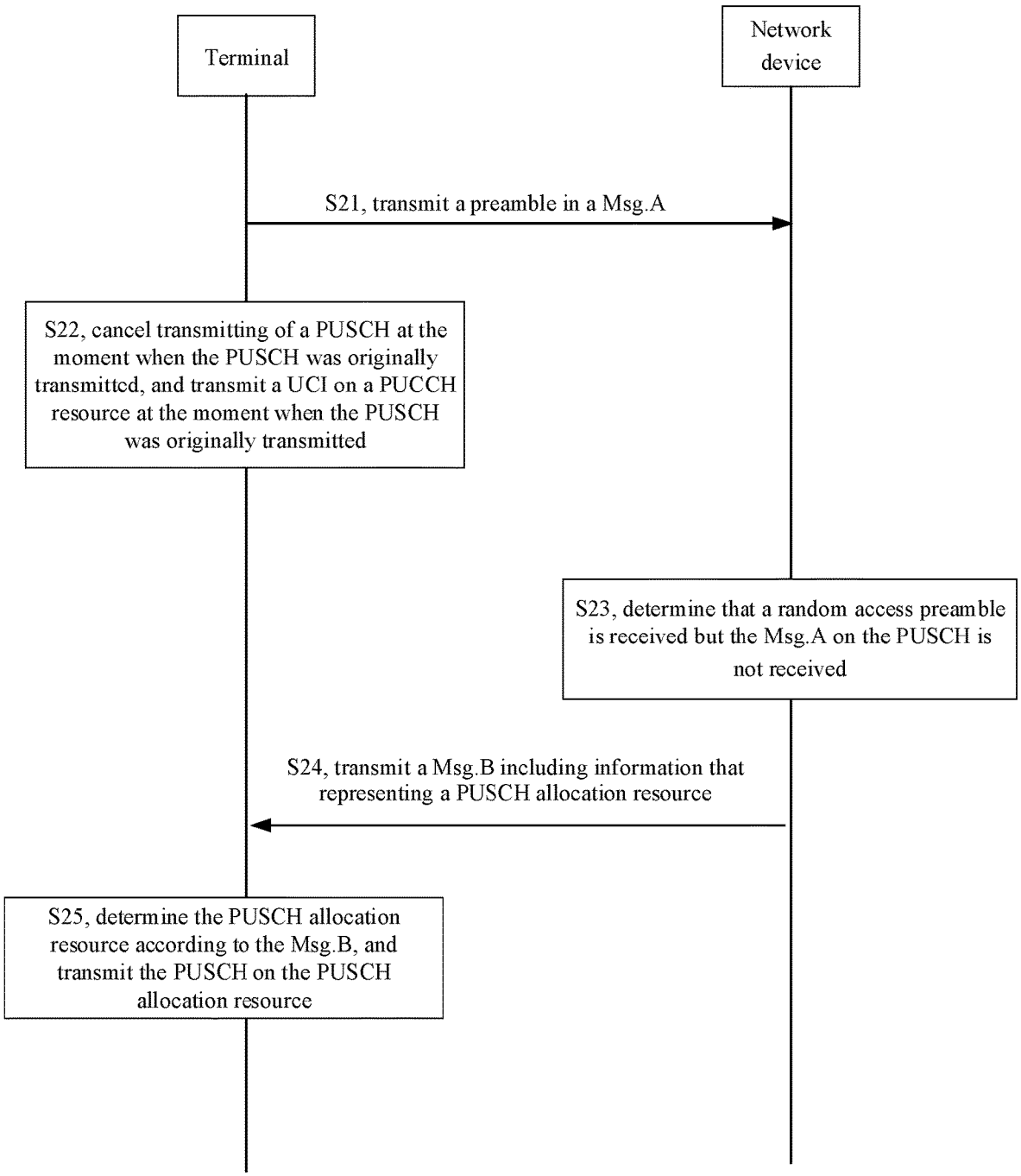
FIG. 3 is a flowchart of another random access method according to an example.

FIG. 3 is a flowchart of a random access method according to an example. As shown in FIG. 3, the random access method is applied to the process of interactions between a network device and a terminal, and includes the following steps.

In step S21, the terminal transmits a preamble in a Msg.A, and the network device receives the preamble in the Msg.A.

In step S22, the terminal cancels transmitting of the PUSCH at the moment when the PUSCH was originally transmitted, and transmits the UCI on the PUCCH resource at the time when the PUSCH was originally transmitted.

In step S23, the network device determines that the random access preamble is received but the Msg.A on the PUSCH is not received.

In step S24, the network device transmits the Msg.B. The Msg.B includes information representing a PUSCH allocation resource.

In step S25, the terminal receives the Msg.B, determines the PUSCH allocation resource according to the Msg.B, and transmits the PUSCH on the PUSCH allocation resource.

Figure 4:
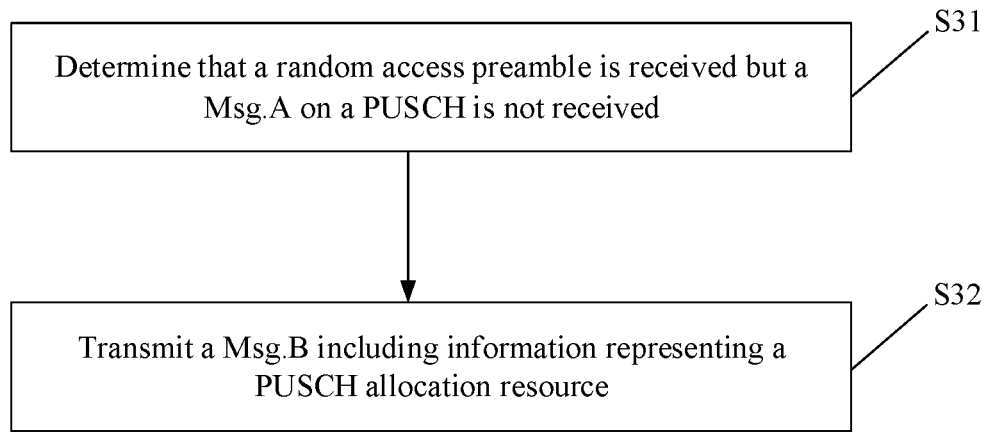
FIG. 4 is a flowchart of yet another random access method according to an example.

FIG. 4 is a flowchart of a random access method according to an example. As shown in FIG. 4, the random access method is applied to a network device and includes the following steps.

In step S31, it is determined that a random access preamble is received but a Msg.A on a PUSCH is not received.

In step S32, a Msg.B is transmitted. The Msg.B includes information representing a PUSCH allocation resource.

The implementation process of the random access methods involved in FIG. 3 and FIG. 4 of the present disclosure is similar to the implementation process of the random access method involved in the above example. So, if description of the implementation process of the random access methods involved in FIG. 3 and FIG. 4 is not sufficiently detailed, please refer to related description of the above example.

In the random access method provided by the present disclosure, when it is determined that there is the transmission of the UCI overlapping with the transmission of the Msg.A on the PUSCH, it is judged whether to allow the transmission of the UCI to be multiplexed in the PUSCH. In response to allowing the transmission of the UCI to be multiplexed in the PUSCH, the transmission of the UCI is multiplexed in the PUSCH, reducing the possibility of the transmission failure of the UCI. In response to not allowing the transmission of the UCI to be multiplexed in the PUSCH, the UCI is transmitted on the PUCCH. Since the transmission robustness of the PUCCH is lower than that of the PUSCH, the possibility of the transmission failure of the UCI may be reduced.

Based on the same concept, an example of the present disclosure further provides a random access apparatus.

It can be understood that, in order to implement the above functions, the random access apparatus provided in the example of the present disclosure includes hardware structures and/or software modules corresponding to each function. In combination with units and algorithm steps of the instances disclosed in the examples of the present disclosure, the example of the present disclosure may be implemented in the form of hardware or a combination of hardware and computer software. Whether a certain function is executed by hardware or computer software-driven hardware depends on specific applications and design constraint conditions of the technical solution. Those skilled in the art may use different methods for each specific application to implement the described functions, but such implementation should not be considered as going beyond the scope of the technical solution of the example of the present disclosure.

Figure 5:
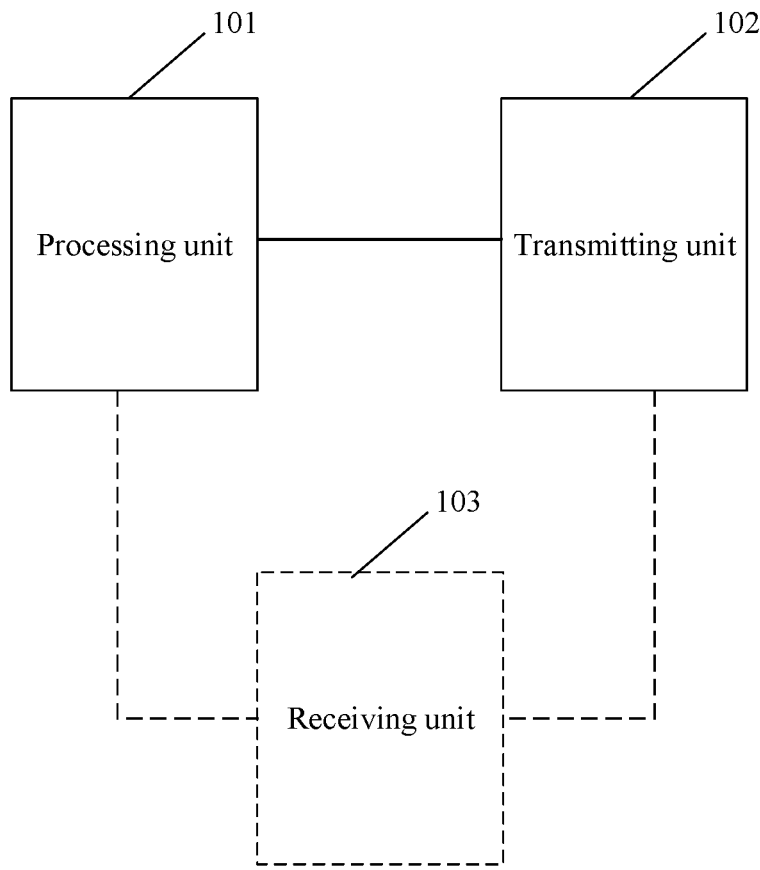
FIG. 5 is a block diagram of a random access apparatus according to an example.

FIG. 5 is a block diagram of a random access apparatus 100 according to an example. Referring to FIG. 5, the apparatus 100 is applied to a terminal, and includes a processing unit 101 and a transmitting unit 102.

The processing unit 101 is configured to determine that there is a transmission of a UCI overlapping with a transmission of a Msg.A on a PUSCH. The transmitting unit 102 is configured to judge whether to allow the transmission of the UCI to be multiplexed in the PUSCH. In response to allowing the transmission of the UCI to be multiplexed in the PUSCH, the transmission of the UCI is multiplexed in the PUSCH. In response to not allowing the transmission of the UCI to be multiplexed in the PUSCH, the UCI is transmitted on a physical uplink control channel (PUCCH).

In one example, the transmitting unit 102 is configured to judge whether to allow the transmission of the UCI to be multiplexed in the PUSCH according to a preset transmission rule.

The preset transmission rule is predetermined according to a communication link state in the following manners: in response to the communication link being in an abnormal state, the transmission of the UCI is allowed to be multiplexed in the PUSCH, and in response to the communication link being in a normal state, the transmission of the UCI is not allowed to be multiplexed in the PUSCH.

The abnormal state of the communication link includes one or a combination of the following states: a state that a downlink data arrivals but uplink is out-of synchronization; a state that an uplink data arrivals but uplink is out-of synchronization; or a state that a beam connection is failure. The normal state of the communication link includes one or a combination of the following states: a state that an uplink data arrives but there is no PUCCH resource for transmitting a scheduling request; or a state that the uplink data arrives but the scheduling request is failure.

In another example, the transmitting unit 102 is further configured to: transmit a Msg.A after determining that transmission of the UCI on the PUCCH is completed. The apparatus 100 in the present disclosure further includes a receiving unit 103. The receiving unit 103 is configured to: receive a Msg.B.

In yet another example, the transmitting unit 102 is further configured to: transmit a random access preamble before transmitting the UCI on the PUCCH. The apparatus 100 in the present disclosure further includes the receiving unit 103. The receiving unit 103 is configured to: receive a Msg.B after determining that transmission of the UCI on the PUCCH is completed. The Msg.B includes information representing a PUSCH allocation resource. The transmitting unit 102 is further configured to: determine the PUSCH allocation resource according to the Msg.B, and transmit the PUSCH on the PUSCH allocation resource.

Figure 6:
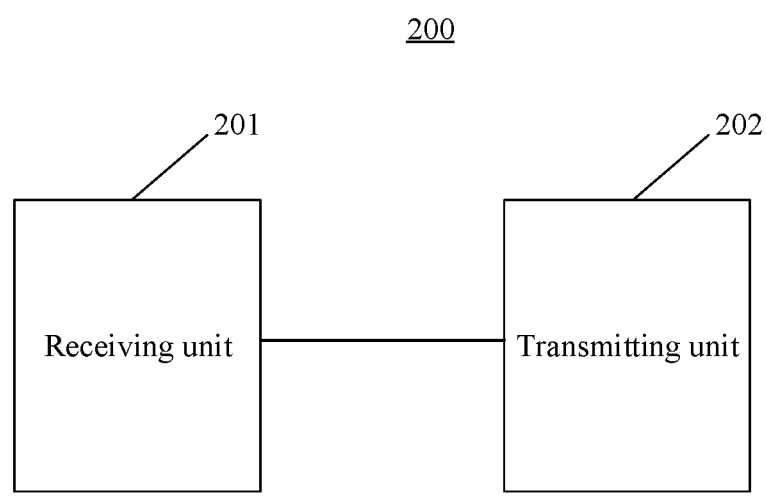
FIG. 6 is a block diagram of a random access apparatus according to an example.

FIG. 6 is a block diagram of a random access apparatus 200 according to an example. Referring to FIG. 6, the apparatus 200 is applied to a network device, and includes a receiving unit 201 and a transmitting unit 202.

The receiving unit 201 is configured to receive a random access preamble, and determine that the random access preamble is received but a Msg.A on a PUSCH is not received. The transmitting unit 202 is configured to transmit the Msg.B. the Msg.B includes information representing a PUSCH allocation resource.

Regarding the apparatus in the above example, a specific manner in which each module executes operations has been described in detail in the example related to the method, which will not be illustrated in detail.

Figure 7:
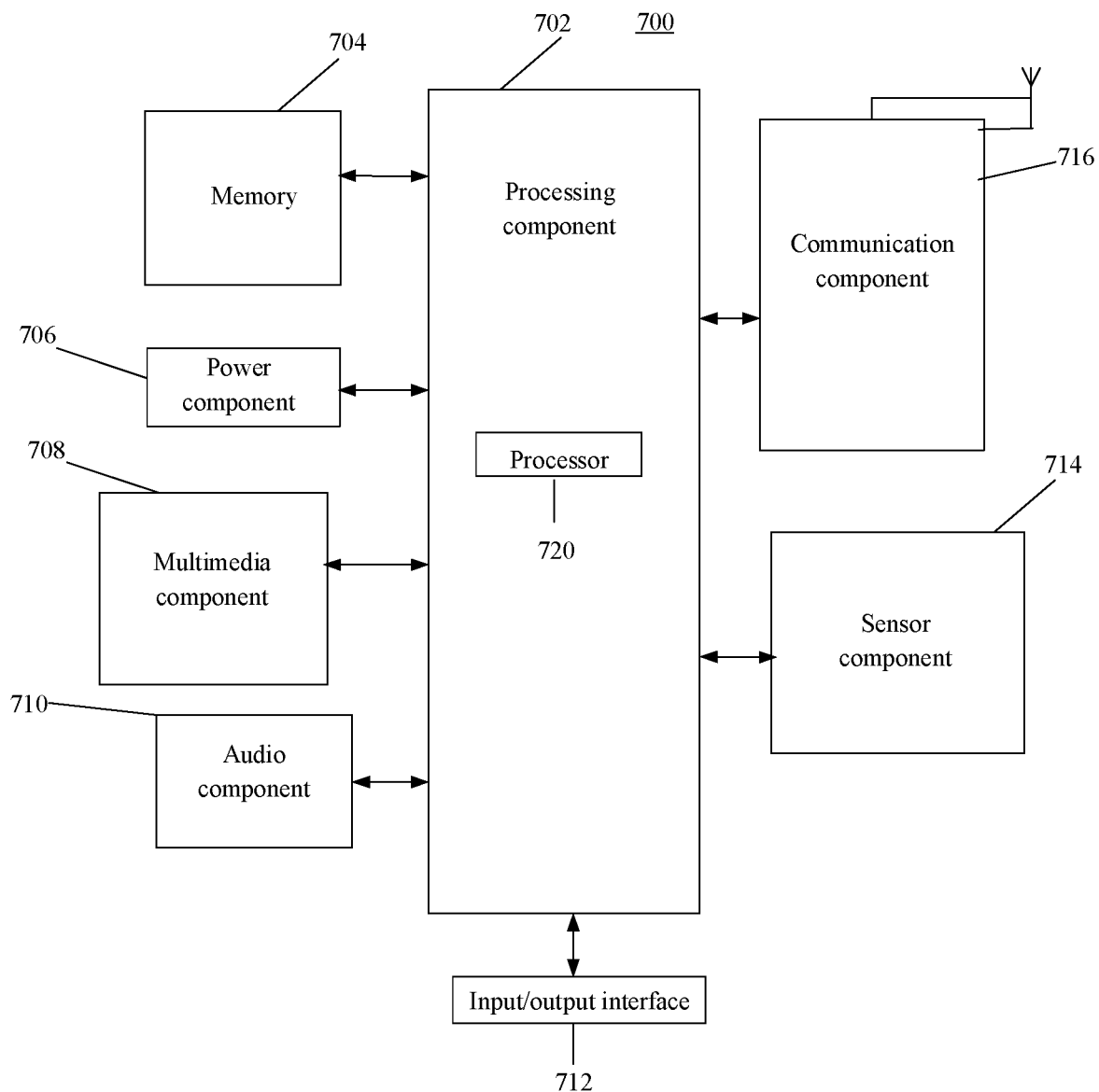
FIG. 7 is a block diagram of an apparatus according to an example.

FIG. 7 is a block diagram of a random access apparatus 700 according to an example. For example, the apparatus 700 may be a mobile phone, a computer, a digital broadcasting terminal, a messaging device, a game console, a tablet device, a medical device, a fitness device, a personal digital assistant, etc.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls overall operations of the apparatus 700, such as operations associated with display, telephone calls, data communications, camera operations, and recording operations. The processing component 702 may include one or more processors 720 to execute instructions to complete all or part of the steps of the above method. In addition, the processing component 702 may include one or more modules to facilitate interactions between the processing component 702 and other components. For example, the processing component 702 may include a multimedia module to facilitate interactions between the multimedia component 708 and the processing component 702.

The memory 704 is configured to store various types of data to support the operations of the apparatus 700. Examples of such data include instructions for any application or method operating on the apparatus 700, contact data, phone book data, messages, pictures, videos, etc. The memory 704 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 706 provides power for various components of the apparatus 700. The power component 706 may include a power management system, one or more power supplies, and other components associated with generating, managing, and distributing power to the apparatus 700.

The multimedia component 708 includes a screen that provides an output interface between the apparatus 700 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, swiping, and gestures on the touch panel. The touch sensor may not only sense a boundary of a touch or swiping action, but also detect duration and pressure related to a touch or swiping operation. In some examples, the multimedia component 708 includes a front camera and/or a rear camera. When the apparatus 700 is in an operation mode, such as a shooting mode or a video mode, the front camera and/or the rear camera may receive external multimedia data. Each of the front camera and the rear camera may be a fixed optical lens system or has a focal length and optical zoom capabilities.

The audio component 710 is configured to output and/or input audio signals. For example, the audio component 710 includes a microphone (MIC), and when the apparatus 700 is in an operation mode, such as a call mode, a recording mode, or a voice recognition mode, the microphone is configured to receive external audio signals. The received audio signals may be further stored in the memory 704 or transmitted via the communication component 716. In some examples, the audio component 710 further includes a loudspeaker configured to output the audio signals.

The I/O interface 712 provides an interface between the processing component 702 and a peripheral interface module. The above peripheral interface module may be a keyboard, a click wheel, buttons, etc. These buttons may include, but are not limited to: a home button, a volume button, a start button, and a lock button.

The sensor component 714 includes one or more sensors configured to provide the apparatus 700 with various aspects of state assessment. For example, the sensor component 714 may detect an on/off state of the apparatus 700, and relative positioning of components, such as a display and a keypad of the apparatus 700. The sensor component 714 may also detect a position change of the apparatus 700 or a component of the apparatus 700, presence or absence of contact between the user and the apparatus 700, the orientation or acceleration/deceleration of the apparatus 700, and a temperature change of the apparatus 700. The sensor component 714 may include a proximity sensor configured to detect the presence of nearby objects when there is no physical contact. The sensor component 714 may also include a light sensor, such as a CMOS or a CCD image sensor, for use in imaging applications. In some examples, the sensor component 714 may further include an acceleration sensor, a gyroscope sensor, a magnetic sensor, a pressure sensor, or a temperature sensor.

The communication component 716 is configured to facilitate wired or wireless communications between the apparatus 700 and other devices. The apparatus 700 may access a communication standard-based wireless network, such as WiFi, 2G, or 3G, or a combination thereof. In an example, the communication component 716 receives a broadcast signal or broadcast related information from an external broadcast management system via a broadcast channel. In an example, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 700 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to execute the above method.

In an example, the apparatus 700 is applied to an Internet of Things device, and includes: a processor; and a memory configured to store processor-executable instructions. The processor is configured to execute the above random access method.

In an example, a non-transitory computer-readable storage medium including an instruction is further provided, such as the memory 704 including an instruction. The above instruction may be executed by the processor 720 of the apparatus 700 to complete the above method. For example, the non-transitory computer-readable storage medium may be an ROM, a random access memory (RAM), a CD-ROM, a magnetic tape, a floppy disk, an optical data storage device, etc.

Figure 8:
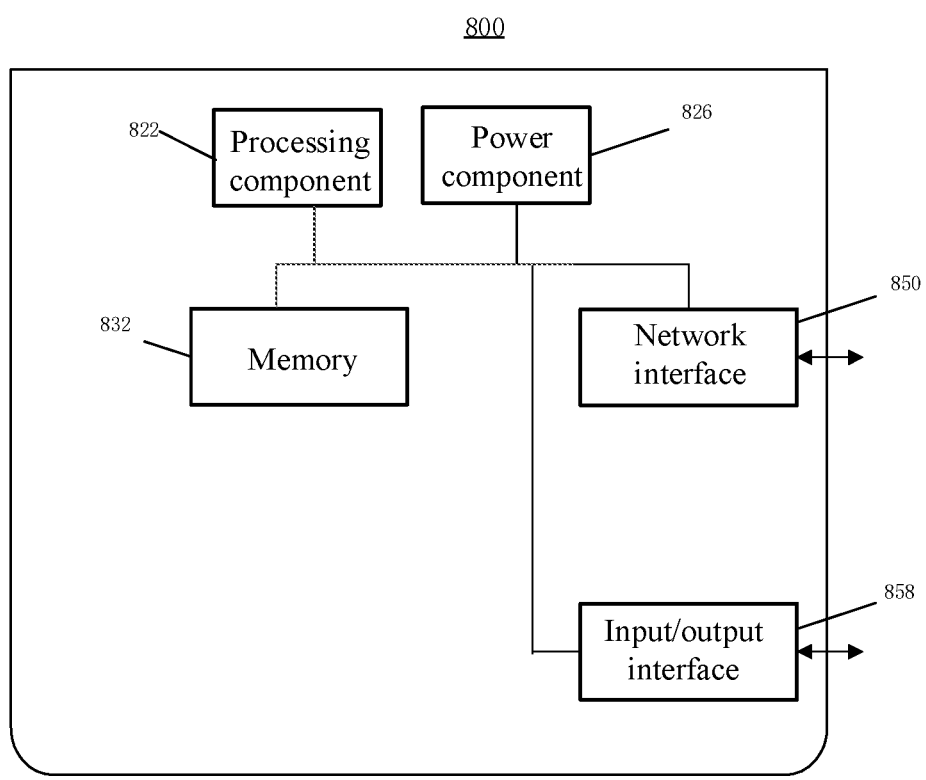
FIG. 8 is a block diagram of an apparatus according to an example.

FIG. 8 is a block diagram of a random access apparatus 800 according to an example. For example, the apparatus 800 may be provided as a network device, such as a base station. Referring to FIG. 8, the apparatus 800 includes a processing component 822. The processing component 822 further includes one or more processors, and a memory resource represented by a memory 832, configured to store instructions executable by the processing component 822, such as applications. The applications stored in the memory 832 may include one or more modules each corresponding to a set of instructions. In addition, the processing component 822 is configured to execute the instructions to execute the above method.

The apparatus 800 may further include a power component 826 configured to perform power management of the apparatus 800, a wired or wireless network interface 850 configured to connect the apparatus 800 to a network, and an input/output (I/O) interface 858. The apparatus 800 may operate based on an operating system stored in the memory 832, such as Windows Server™, Mac OS X™, Unix™, Linux™, FreeBSD™ or the like.

The technical solution provided by the examples of the present disclosure may include the following beneficial effects: it is determined that there is the transmission of the uplink control information overlapping with the transmission of the Msg.A on the PUSCH, and it is judged whether to allow the transmission of the uplink control information to be multiplexed in the PUSCH. In response to allowing the transmission of the uplink control information to be multiplexed in the PUSCH, the transmission of the uplink control information is multiplexed in the PUSCH, and in response to not allowing the transmission of the uplink control information to be multiplexed in the PUSCH, the uplink control information is transmitted on the PUCCH, in this way, the possibility of the transmission failure of the uplink control information is reduced.

It can be understood that in the present disclosure, the "network" and the "system" are sometimes used interchangeably, but those skilled in the art can understand their meanings.

It can be further understood that in the present disclosure, "plurality" refers to two or more, and other quantifiers are similar. "And/or" describes an association relationship of associated objects, and indicates that there may be three types of relationships. For example, A and/or B may mean: A exists alone, A and B exist at the same time, and B exists alone. The character "/" generally indicates that the associated objects before and after are in an "or" relationship. The singular forms "a", "the" and "this" are also intended to include plural forms, unless the context clearly indicates other meanings.

It can be understood that in the examples of the present disclosure, although the operations are described in the drawings in a particular order, they are not to be understood as requiring that the operations be performed in the particular order shown, or in a serial order, or that all of the operations shown be performed to achieve a desired result. In certain circumstances, multitasking and parallel processing may be advantageous.

Other examples of the present disclosure will be apparent to those skilled in the art from consideration of the specification and practice of the present disclosure disclosed here. The application is intended to cover any variations, uses, or adaptations of the present disclosure following the general principles of the present disclosure and including common general knowledge or customary technical means in the art that are not disclosed in the present disclosure. It is intended that the specification and the examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A random access method, comprising:
   determining, by a terminal, that a transmission of an uplink control information overlaps with a transmission of a Msg.A on a physical uplink shared channel (PUSCH);
   judging, by the terminal, whether to allow the transmission of the uplink control information to be multiplexed in the PUSCH;
   in response to allowing the transmission of the uplink control information to be multiplexed in the PUSCH, multiplexing, by the terminal, the transmission of the uplink control information in the PUSCH; and
   in response to not allowing the transmission of the uplink control information to be multiplexed in the PUSCH, transmitting, by the terminal, the uplink control information on a physical uplink control channel (PUCCH);
   wherein judging whether to allow the transmission of the uplink control information to be multiplexed in the PUSCH, comprises:
   judging, according to a preset transmission rule, whether to allow the transmission of the uplink control information to be multiplexed in the PUSCH;
   wherein the preset transmission rule is predetermined according to a state of a communication link in following manners:
   in response to the communication link being in an abnormal state, allowing the transmission of the uplink control information to be multiplexed in the PUSCH; and
   in response to the communication link being in a normal state, not allowing the transmission of the uplink control information to be multiplexed in the PUSCH.

2. The random access method according to claim 1, wherein the abnormal state of the communication link comprises at least one of following states:
   a state that a downlink data arrivals but uplink is out-of synchronization;
   a state that an uplink data arrivals but uplink is out-of synchronization; or
   a state that a beam connection is failure.

3. The random access method according to claim 1, wherein the normal state of the communication link comprises at least one of following states:
   a state that an uplink data arrives but there is no PUCCH resource for transmitting a scheduling request; or
   a state that the uplink data arrives but the scheduling request is failure.

4. The random access method according to claim 1, further comprising:
   after determining that the transmission of the uplink control information on the PUCCH is completed, transmitting the Msg.A and receiving a Msg.B.

5. The random access method according to claim 1, further comprising:
   transmitting a random access preamble before transmitting the uplink control information on the PUCCH, and receiving a Msg.B after determining that the transmission of the uplink control information on the PUCCH is completed, wherein the Msg.B comprises information representing a PUSCH allocation resource; and determining the PUSCH allocation resource according to the Msg.B, and transmitting the PUSCH on the PUSCH allocation resource.

6. A random access apparatus, applied to a terminal, and comprising:

a processor; and a memory configured to store processor-executable instructions;

wherein the processor is configured to:

determine that a transmission of an uplink control information overlaps with a transmission of a Msg.A on a physical uplink shared channel (PUSCH);

judge whether to allow the transmission of the uplink control information to be multiplexed in the PUSCH;

multiplex the transmission of the uplink control information in the PUSCH, in response to allowing the transmission of the uplink control information to be multiplexed in the PUSCH; and transmit the uplink control information on a physical uplink control channel (PUCCH), in response to not allowing the transmission of the uplink control information to be multiplexed in the PUSCH;

wherein the processor is configured to:

judge, according to a preset transmission rule, whether to allow the transmission of the uplink control information to be multiplexed in the PUSCH;

wherein the preset transmission rule is predetermined according to a state of a communication link in following manners:

in response to the communication link being in an abnormal state, allowing the transmission of the uplink control information to be multiplexed in the PUSCH; and in response to the communication link being in a normal state, not allowing the transmission of the uplink control information to be multiplexed in the PUSCH.

7. The random access apparatus according to claim 6, wherein the abnormal state of the communication link comprises at least one of following states:

a state that a downlink data arrivals but uplink is out-of synchronization;

a state that an uplink data arrivals but uplink is out-of synchronization; or a state that a beam connection is failure.

8. The random access apparatus according to claim 6, wherein the normal state of the communication link comprises at least one of following states:

a state that an uplink data arrives but there is no PUCCH resource for transmitting a scheduling request; or a state that the uplink data arrives but the scheduling request is failure.

9. The random access apparatus according to claim 6, the processor is configured to:

transmit the Msg.A and receiving a Msg.B, after determining that the transmission of the uplink control information on the PUCCH is completed.

10. The random access apparatus according to claim 6, wherein the processor is configured to:

transmit a random access preamble before transmitting the uplink control information on the PUCCH, and receive a Msg.B after determining that the transmission of the uplink control information on the PUCCH is completed, wherein the Msg.B comprises information representing a PUSCH allocation resource; and determine the PUSCH allocation resource according to the Msg.B, and transmit the PUSCH on the PUSCH allocation resource.

* * * * *